April 7, 1953 R. D. RICHARDSON 2,633,737
GAS ANALYZER FOR PLURAL MIXTURES
Filed May 25, 1945 2 SHEETS—SHEET 1
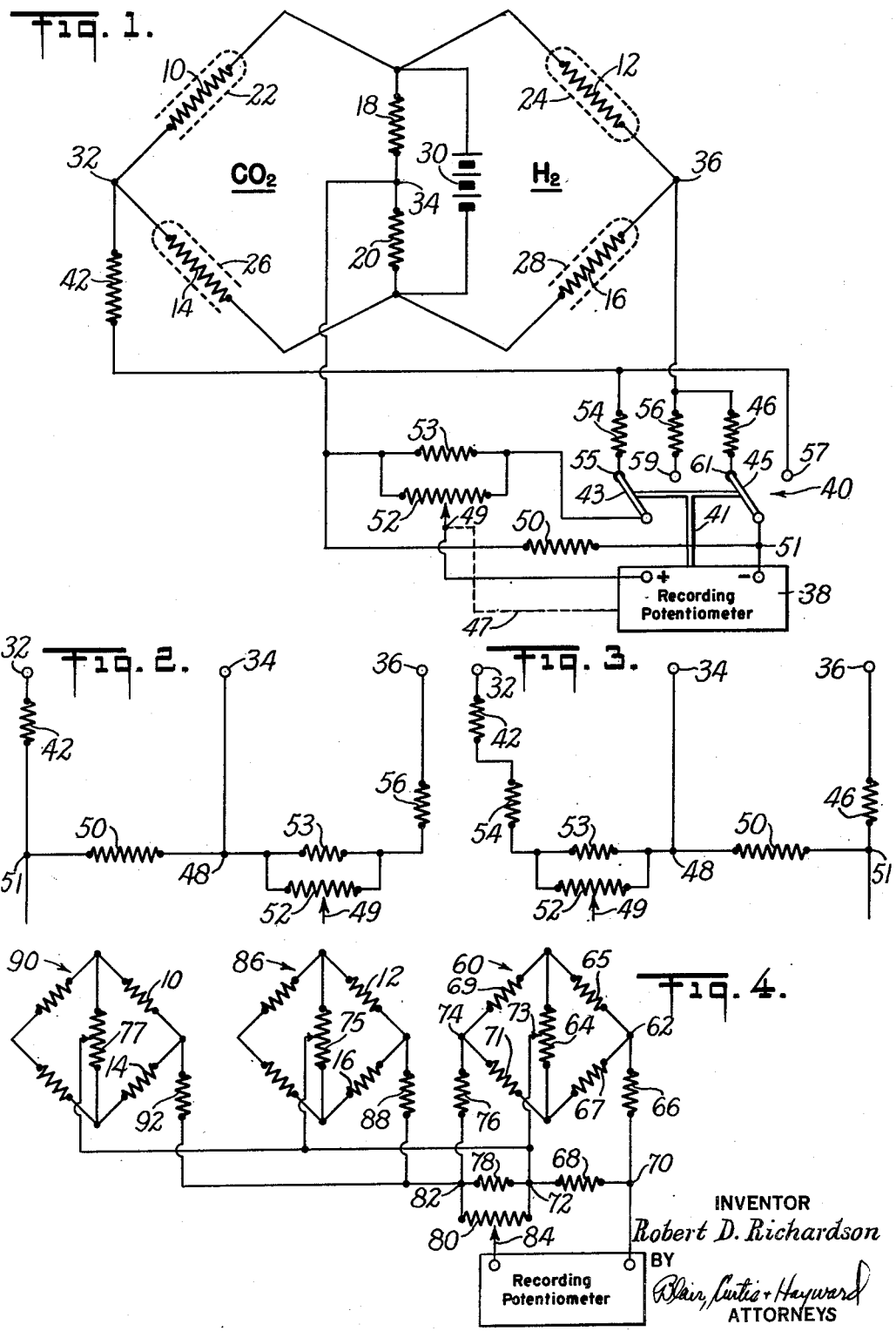
INVENTOR
Robert D. Richardson
BY
Blair, Curtis + Hayward
ATTORNEYS April 7, 1953 R. D. RICHARDSON 2,633,737
GAS ANALYZER FOR PLURAL MIXTURES
Filed May 25, 1945 2 SHEETS—SHEET 2

INVENTOR
ROBERT D. RICHARDSON
BY
Blair Curtis & Hayward
ATTORNEYS

Patented Apr. 7, 1953

2,633,737

UNITED STATES PATENT OFFICE 2,633,737

GAS ANALYZER FOR PLURAL MIXTURES

Robert D. Richardson, Michigan City, Ind., assignor to Cambridge Instrument Co., Inc., New York, N. Y., a corporation of New York Application May 25, 1945, Serial No. 595,705

9 Claims. (Cl. 73—27)

This invention relates to gas analysis and more particularly to a method and an instrument for determining the proportions of two or more constituents in a gas mixture.

Gases differ from one another in their thermal conductivities; that is, in their ability to conduct heat, and this characteristic has been used to identify and determine the percentages of certain gases in a gas mixture. For example, considering air as a standard medium, at normal atmospheric temperatures, the thermal conductivity of hydrogen is much higher than that of air, whereas, the thermal conductivity of carbon dioxide is less than air. Thus, if hydrogen is present in the air, the thermal conductivity of the gas mixture is greater than that of air, whereas, if carbon dioxide is present in air, the thermal conductivity of the gas mixture is less than that of air. A problem arises with respect to this analysis of gas when hydrogen and carbon dioxide are both present because the change in thermal conductivity caused by the hydrogen is counteracted by the change in conductivity caused by the carbon dioxide.

Prior to the present invention, apparatus has been provided, such as the Shakespear katharometer, for analyzing a gas when only one variable is present. With this prior apparatus two wires are heated at a controlled rate one being in a standard gas medium and the other being in the gas mixture being tested, and the cooling effect or thermal conductivity of each of the two gas mediums is evidenced as an inverse function of the temperature of its hot wire; that is, where the thermal conductivity of the gas is high, its wire will be cooled at a rapid rate and will be maintained at a relatively low temperature so that the wire has a relatively low resistance, whereas, if the thermal conductivity of the gas is low, the wire will be cooled at a slow rate, and the temperature and resistance of the wire is relatively high. The hot wires are in the form of resistance coils or elements, and are connected as legs of a Wheatstone bridge so that a difference in the resistances of the two resistance elements causes an unbalance of the bridge and a deflection of the bridge galvanometer. Thus, the presence in the gas mixture of a gas having a thermal conductivity other than that of air causes the bridge to become unbalanced, and the bridge galvanometer is calibrated to indicate the precentage of the gas for which the test is being made. With some apparatus the measurement of a gas such as carbon dioxide is performed by removing the carbon dioxide, taking a thermal conductivity test of the gas mixture before and after the removal process, and then balancing the results of the two tests against each other so that the difference in the two tests is an indication of the amount of carbon dioxide in the original gas mixture.

This prior apparatus is limited to the testing of gas mixtures such as where there is only one variable, and it is an object of the present invention to provide for the analysis of gas mixtures where two or more of the constituent gases vary independently. Another feature of the invention is that the reading or indication of each gas is corrected automatically for errors occurring due to the presence of variable amounts of one or more other gases in the original gas mixture being tested. Thus, when a gas is removed from a mixture at the time it is being measured, the subsequent tests for other gases are automatically corrected for such removal of the gas. When the gas mixture being tested is used as the basis for comparison, as is the case when carbon dioxide is removed from the gas mixture as it is being measured, there is an error in the test due to the presence of varying amounts of other gases; this is true because such other gases change the thermal conductivity of the gas mixture which is being used as the standard of comparison. Here again with the present invention the indication or reading of the gas being tested for, such as carbon dioxide, is corrected automatically by interposing a correction factor in accordance with the amount of the other gases present.

Therefore, it is a further object of this invention to provide for the accurate analysis of gas mixtures having two or more variable constituents and to interpose into the test for each gas a correction factor to correct the test for errors resulting from the presence in the original gas mixture of other gases.

These and other objects will be in part obvious and in part pointed out below.

In the accompanying drawings are shown diagrammatically an apparatus by which these objects are achieved. It should be understood that these drawings and the following description are not intended to be exhaustive or limiting of the invention but on the contrary are chosen for purposes of illustration and with a view to explaining to others skilled in the art the principles of the invention as well as the best manner of applying it to practical use and to suggest various modifications so that others skilled in the art will be enabled to alter and modify the structures within the scope of the invention and to embody the invention in numerous forms each as may be best suited to the conditions and requirements of a particular use.

In the drawings:

Figure 1 is a simplified wiring diagram of one embodiment of the invention;

Figures 2 and 3 are partial circuit diagrams showing the circuits when the double-pole double-throw switch of Figure 1 is in its two positions;

Figure 4 is a further simplified wiring diagram representing an additional circuit arrangement which may be used in connection with an arrangement represented in Figure 1, and, Figure 5 is a schematic showing of the structure which is used in connection with the embodiment of Figure 1 and which may also be used in connection with the arrangement of Figure 4.

Figure 5:
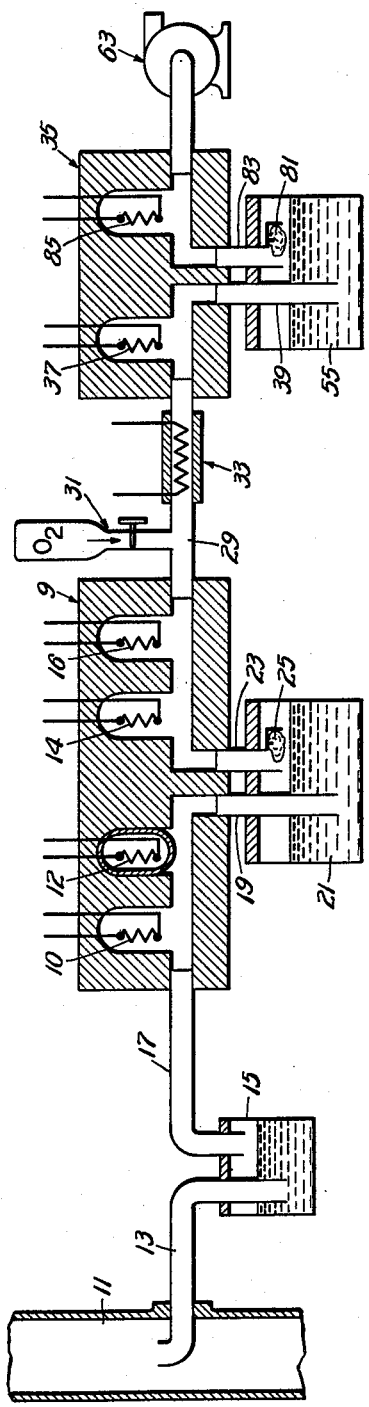

Referring particularly to Figure 1 of the drawings, there is shown a six arm bridge arrangement wherein a substantially continuous record is made of the percentages of carbon dioxide and hydrogen in a gas sample. With this arrangement the carbon dioxide is removed from the gas mixture and an indication is obtained of the amount of carbon dioxide in the gas mixture by comparing the thermal conductivities of the gas mixture before and after the removal of the carbon dioxide; this indication is then corrected to account for an error resulting from the presence of hydrogen in the original gas mixture. As explained above, this error occurs because the presence of hydrogen in the gas mixture causes a change in the thermal conductivity which is being used as the standard of comparison. With this apparatus the percentage of hydrogen is measured by comparing the thermal conductivities of the gas mixture after the carbon dioxide has been removed and a standard gas sample. This indication is corrected in accordance with the amount of carbon dioxide in the original gas mixture so that the percentage of hydrogen is in terms of the original gas mixture as distinguished from being in terms of the gas mixture after the carbon dioxide has been removed.

The six arm bridge is formed by four temperature sensitive elements 10, 12, 14 and 16, and two insensitive elements 18 and 20. The bridge has three legs formed respectively by elements 10 and 14, 18 and 20, and 12 and 16, and two bridges are formed, the left hand carbon dioxide bridge being formed by the leg composed of elements 10 and 14 and the legs composed of 18 and 20, and the right hand hydrogen bridge being formed by the leg composed of elements 12 and 16 and the leg composed of elements 18 and 20. Illustratively, elements 10, 12, 14 and 16 are spirals of platinum wire which have a relatively high resistance-temperature coefficient and they are heated by current from the battery 30. As will be explained more fully below, these elements are positioned in a constant temperature heat-conducting metal block 9 (see Figure 5) and the gas to be tested surrounding them is saturated with water vapor to insure standard operating conditions. Elements 18 and 20 are coils of wire having a zero temperature resistance coefficient, for example, manganin. The broken lines (Figure 1) around elements 10, 14 and 16 indicate that the elements are exposed to the gas mixture, whereas the broken line around element 12 indicates that this element is sealed in a closed glass envelope.

The carbon dioxide bridge has two terminals, 32 and 34, the latter of which is common to the hydrogen bridge, and the hydrogen bridge having another terminal 36. The bridges are connected to a potentiometer recorder 38 through a double-pole double-throw switch 40 which is mechanically connected to the potentiometer recorder by a reversing arm 41 of known construction, and this switch is thrown back and forth to connect the potentiometer recorder alternately to the two bridges. The common terminal 34 of the bridges is connected through a resistance 50 to one blade 43 of the switch and to one side of the potentiometer recorder, and this terminal 34 is also connected through a resistance 53 and a parallel slide wire resistance shunt 52 to the other blade 45 of the switch. Shunt 52 has thereon a slide 49 which is moved with the balancing slide of the potentiometer recorder 38 with the movement being transmitted to the slide by a mechanical linkage of known construction which is indicated by the broken lines 47. Thus, for any value which is recorded on the potentiometer slide, 49 is given a pre-determined position on shunt 52. Terminal 32 of the carbon dioxide bridge is connected through a resistance 42 to two outside terminals 55 and 57 of the switch, there being a resistance 54 in series with terminal 55, and terminal 36 of the hydrogen bridge is connected to the center switch terminals 59 and 61, respectively through resistances 56 and 46.

Referring again to Figure 5, elements 10, 12, 14, and 16 are positioned in the constant temperature heat-conducting metal block 9 and the gas mixture to be tested is passed through this block into contact with the respective elements. This gas mixture is led from a supply pipe 11 through a tube 13 to a water container 15 where the gas is bubbled through water so that it is saturated with water vapor. From the top of container 15 the gas is led through a tube 17 to the right through the lefthand chamber of block 9 where it comes into contact with element 10. The gas then passes downwardly through a bubbler tube 19 into a container 21 which is filled with lime water to the level indicated. The gas bubbles up through this lime water with the result that the carbon-dioxide is absorbed into the water. The gas, free of carbon-dioxide, passes from the top of container 21 past a wet sponge 25 so as to be saturated with water, and thence upwardly through a tube 23 and into the righthand chamber of block 9, where it comes into contact with elements 14 and 16.

From the right-hand chamber of block 9 the stream of gas flows to the right through a conduit 29 where it is joined by a controlled stream of oxygen which is supplied through a valve 31. The combined stream passes to the right through a furnace 33 where the carbon monoxide in the gas combines with the added oxygen to form carbon-dioxide. The stream of gas then passes into the left-hand chamber of a block 35 where it comes into contact with an element 37. The gas then passes downwardly through a bubbler tube 39 into a container 55 similar to container 21 and containing lime water to the level indicated. The gas bubbles through this lime water with the result that the carbon-dioxide is absorbed into the water and the stream of gas passes out past a wet sponge 81 through a conduit 83. The stream of gas then passes through the right-hand chamber of block 35 into contact with an element 85 and is withdrawn at the right by a blower 63.

The arrangement of Figures 1 to 3 is concerned only with the measuring of carbon-dioxide and hydrogen and this is accomplished by the elements in block 9, and this will now be discussed more fully. The measuring of the carbon-monoxide in block 35 is discussed below in connection with Figure 4.

For convenience of explanation, Figure 2 shows the circuit from the bridge terminals 32, 34 and 36 when the switch blades 43 and 45 are in the right hand position so as to engage terminals 59 and 57, and Figure 3 shows the corresponding circuit when the switch blades are in the left hand position indicated in the full lines in Figure 1. During the operation the switch is moved back and forth automatically by arm 41 and then the potentiometer is balanced and the reading is made and recorded automatically after each change in the switch position. With the circuit of Figure 2 a reading indicates the percentage of carbon dioxide in the gas mixture, and with the circuit of Figure 3 a reading indicates the percentage of hydrogen in the gas mixture.

Referring particularly to Figure 2, the voltage resulting from an unbalance of the carbon dioxide bridge caused by the presence in the original gas mixture of carbon dioxide is impressed from the terminals 32 and 34 across the potentiometer shunt resistance 50, there being the carbon dioxide calibration resistor 42 in series in the circuit. Similarly, the voltage resulting from an unbalance of the hydrogen bridge caused by the presence of hydrogen in the gas mixture is impressed across the resistance 53 and its slide wire shunt 52 with the hydrogen calibration resistance 56 in series in the circuit. The potentiometer recorder is connected between the slide 49 of slide wire shunt 52 and the terminal 51 at the opposite side of resistance 50, so that a potential is impressed on the potentiometer recorder which is the resultant voltage caused by combining the voltage across resistance 50 with a portion of the voltage impressed across resistance 53. Slide 49 is so positioned on slide wire shunt 52 and the values of resistances 42 and 56 are such that the voltage between slide 49 and terminal 48 is of the proper value to introduce the proper compensation to correct for errors in the reading of the indication of the carbon dioxide bridge which occur as a result of the presence of hydrogen in the gas mixture. In other words, the voltage across resistance 50 is an indication of the amount of carbon dioxide in the gas mixture, but if hydrogen is present in the gas mixture this indication is in error because the gas mixture which is used as a standard for reference has a thermal conductivity which differs from that of nitrogen or air. In order to have a correct indication for the carbon dioxide a correction factor must be applied to the voltage across resistance 50, and this correction factor is applied by connecting the potentiometer across a portion of slide wire shunt 52 in series with resistance 50. As indicated above, slide 49 is positioned in accordance with the position of the potentiometer balancing slide so that the correction factor introduced by shunt 52 varies directly with the value of the carbon dioxide being measured.

In the circuit of Figure 3 the voltage resulting from the unbalance of the hydrogen bridge is impressed from the terminals 34 and 36 across resistance 50, there being the hydrogen calibration resistance 46 in series in the circuit. The voltage resulting from the unbalance of the carbon dioxide bridge is impressed across resistance 54 and its slide wire shunt 52. The potentiometer recorder is connected between the slide 49 and terminal 51, and the resistance values are such that the hydrogen indication represented by the voltage across resistance 50 is corrected in accordance with the amount of carbon dioxide in the original gas mixture, the correction being represented by the voltage between terminal 48 and slide 49. As pointed out above, the error which is corrected for in the hydrogen indication occurs because it is desirable to express the amount of hydrogen in terms of percentage of the original gas mixture and the test for hydrogen is on the gas mixture after carbon dioxide has been removed. Thus, the uncorrected hydrogen indication would be in terms of a higher percentage than the original gas mixture actually included. The correction factor varies with the percentage of carbon dioxide and its magnitude is such that a correct indication is provided. On the other hand, the corrected hydrogen indication is in terms of the original gas mixture which included carbon dioxide. Due to the positioning of slide 49 in accordance with the position of balance of the potentiometer recorder slide, the correction factor is varied depending upon the value of the hydrogen being measured, all in the manner explained above in connection with Figure 2.

The two bridges are built together and are provided with fixed calibration resistances to provide corrected readings of the two gases, and for this reason the apparatus is compact and relatively simple. Certain adjustment and calibration features have been omitted from the showing, but these are known to those skilled in the art.

In the embodiment of Figure 4 an arrangement is represented schematically for measuring the amount of carbon monoxide in a gas mixture after carbon dioxide has been measured and removed and after hydrogen has been measured and removed. This schematic circuit represents the arrangement of the apparatus at the time the reading is being taken for carbon monoxide and it is contemplated that simultaneously readings are available of the amounts of carbon dioxide and hydrogen in the original gas mixture. These separate readings for carbon-dioxide and hydrogen and obtained by connecting elements 10, 12, 14 and 16 in such a manner as to provide dependent carbon-dioxide and hydrogen bridges, and in this respect the arrangement differs from the six arm combine bridge of Figure 1. As indicated above, the gas flows through block 9 where the carbon-dioxide and hydrogen readings are taken and in this process the carbon-dioxide is removed. Then oxygen is added to the gas mixture and the carbon monoxide is changed to carbon dioxide in furnace 33. Thereafter the carbon dioxide is measured by means of bridge 60 with an arrangement which is the same as the arrangement for making the test of the original gas mixture for carbon dioxide. Accordingly, bridge 60 is a six arm bridge identical with the bridge represented in Figure 1, and having at the right a carbon dioxide bridge formed by elements 65 and 67 and resistance 64 and at the left a compensating bridge formed by elements 69 and 71 and resistance 64. The carbon dioxide bridge measures the carbon dioxide that is removed, but produces an indication from its terminals 62 and 73 through a resistance 66 across a potentiometer shunt 68 which has terminals 70 and 72. This indication is in terms of the carbon monoxide which is the equivalent of the carbon dioxide actually measured by the bridge. The compensating bridge has terminals 73 and 74 and impresses a correction indication through a resistance 76 across resistance 78 having a slide wire shunt 80, the parallel circuit having terminals 72 and 82. Shunt 80 has a slide 84 and the potentiometer recorder is connected between terminal 80 and slide 84.

The hydrogen bridge which is used to measure the amount of hydrogen in the original gas mixture is represented at 86 formed by elements 12 and 16 and resistance 75. Bridge 86 also impresses a correction voltage across resistance 78, there being a connection through resistance 88 to terminals 72 and 82. The correction voltage impressed by bridge 86 corrects the indication of bridge 60 to compensate for the presence of hydrogen in the original gas mixture. This compensation is necessary because furnace 33 burns the hydrogen in the gas mixture and produces water so that the other remaining gases appear in increased relative proportions. Similarly, the carbon dioxide bridge which measures the carbon dioxide in the original gas mixture is represented at 90 formed by elements 10 and 14 and resistance 77, and it also impresses a correction voltage across resistance 78, there being a connection through resistance 92 to terminals 72 and 82. Thus, resistance 78 has impressed across it three correction voltages which are as follows:

One from the left hand side of the six arm bridge 60 which corrects the reading for errors due to the presence of other gases in the mixture being measured by bridge 60; another from bridge 90 which corrects the indication for errors due to the removal of carbon dioxide from the original gas mixture; and the other from bridge 86 which corrects the indication for errors resulting in the removal of hydrogen from the gas mixture. These various correction factors are represented by a correction voltage which is of a greater magnitude than that necessary for applying as a correction factor to the voltage across resistance 68. Accordingly, the slide 84 is so positioned that only a portion of this correcting voltage is added to the voltage across resistance 68. With this arrangement proper account can be taken of the addition or removal of hydrogen between the time that the gas mixture is tested for hydrogen and the time the gas mixture is tested for carbon monoxide.

As various embodiments may be made of the above invention and as changes might be made in the embodiment above set forth, it is to be understood that all matter hereinbefore set forth or shown in the accompanying drawings is to be interpreted as illustrative and not in a limiting sense.

What is claimed is:

1. In an instrument for analyzing gas mixtures wherein the gas mixtures are passed along an analyzing path past gas cells, the combination of: a circuit arrangement including, means constituting a source of potential, and means to produce two separate potential values a first one of which results from the comparison of the thermal conductivity of a gas mixture before and after one constituent gas is removed and the second one of which results from the comparison of the thermal conductivity of said gas mixture after said constituent has been removed from the thermal conductivity of a standard gas; and means to produce a resultant indication comprising, a main shunt resistance unit connected so that said first potential value is impressed across it, a secondary shunt resistance unit which includes an adjustable portion and which is connected so that said second potential value is impressed across it, and indicator means connected across said main shunt resistance unit and across said adjustable portion of said secondary resistance unit.

2. In apparatus for measuring gas mixtures, the combination of, means to feed a gas mixture to the apparatus, means to remove carbon dioxide from the gas mixture, a comparative circuit arrangement for measuring the amount of carbon dioxide which is removed from said gas mixture, a second comparative circuit arrangement for measuring the amount of hydrogen in said gas mixture after the carbon dioxide has been removed, a pair of shunts connected respectively across said comparative circuit arrangements, and indicating means connected across the entire portion of one shunt and across a predetermined portion of the other shunt whereby an indication of carbon dioxide is obtained which is corrected for the error in the original indication caused by the presence of hydrogen in the original gas mixture.

3. Apparatus as described in claim 2, which includes means to vary said predetermined portion of said other shunt in accordance with the indication of carbon dioxide.

4. In an instrument for analyzing gas mixtures wherein a substantially continuous indication may be had of the percentages of one or more gases in a flowing stream of the gas mixture, the combination of, means to remove one of the constituent gases, an electrical circuit arrangement including, means constituting one or more sources of potential, and a plurality of impedance units connected to said source or sources of potential into an electrical network and adapted to produce two separate potential values, a first one of which results from the comparison of the thermal conductivity of a gas mixture before and after one constituent gas is removed and the second one of which results from the comparison of the thermal conductivity of said gas mixture after said constituent has been removed with the thermal conductivity of a standard gas, and means to produce a resultant indication comprising, a main impedance unit connected to one of said potential values, a second impedance unit which includes an adjustable portion and which is connected to the other of said potential values, and indicator means connected across said main impedance unit and across said adjustable portion of said second impedance unit.

5. An instrument as described in claim 4 wherein each of said impedance units is a resistor, and wherein the gas removed is carbon dioxide and the second of said two potential values is substantially an indication of the amount of hydrogen in the gas mixture.

6. In apparatus for measuring gas mixtures, the combination of, means to feed a gas mixture to the apparatus, means to remove carbon dioxide from the gas mixture, a comparative circuit arrangement for measuring the amount of carbon dioxide which is removed from said gas mixture, a second comparative circuit arrangement for measuring the amount of hydrogen in said gas mixture after the carbon dioxide has been removed, a pair of shunts connected respectively across said comparative circuit arrangements, and indicating means connected across the entire portion of one shunt and across a predetermined portion of the other shunt whereby an indication of hydrogen is obtained which is corrected for the error in the original indication caused by the presence of carbon dioxide in the original gas mixture.

7. In apparatus for measuring the constituents in gas mixtures, the combination of, means to feed a gas mixture to the apparatus, means to remove a particular first gas from the gas mixture, a first comparison means for comparing the gas mixture before and after said first gas is removed thereby to measure the amount of said first gas removed, a second comparison means for measuring the amount of a second gas in said gas mixture after the first-mentioned gas has been removed, and measuring means connected to said comparison means to produce a resultant indication, said measuring means comprising a main impedance unit connected to one of said comparison means, a second impedance unit which includes an adjustable portion, said second impedance unit being connected to the other of said comparison means, and indicating means connected across said main impedance unit and across a predetermined portion of said second impedance unit.

8. In apparatus for measuring the constituents in gas mixtures, the combination of, means to feed a gas mixture to the apparatus, means to remove a particular first gas from the gas mixture, a first comparison means for comparing the gas mixture before and after said first gas is removed thereby to measure the amount of said first gas removed, a second comparison means for measuring the amount of a second gas in said gas mixture after the first-mentioned gas has been removed, and measuring means connected to said comparison means comprising, a main impedance unit connected to have a potential value impressed across it which varies with the measurement of one of said comparison means and a second impedance unit which includes an adjustable portion and which is connected to have a potential value impressed across it which varies with the measurement of the other of said comparison means and indicating means connected across said main impedance unit and across said adjustable portion of said second impedance unit.

9. In apparatus for analyzing gas mixtures wherein a stream of the gas is passed along an analyzing path and the gas mixture may contain two or more gases in variable amounts, the combination of, means to feed a gas mixture to the apparatus and to flow it along a gas analyzing path, two separate comparative circuit arrangements which operate independently and are positioned in sequence along said path, means to remove a first gas in connection with the measurement of said first gas by one of said comparative circuit arrangements, the other of said comparative circuit arrangements being operative to measure the amount of a second gas in the resultant gas mixture after said first gas has been removed, a pair of shunts connected respectively across said comparative circuit arrangements, and indicating means connected across the entire portion of one of said shunts and across a predetermined portion of the other of said shunts whereby an indication of said second gas is obtained which is corrected for the presence of the said first gas in the original gas mixture.

ROBERT D. RICHARDSON.

REFERENCES CITED

The following references are of record in the file of this patent:

UNITED STATES PATENTS

| Number    | Name         | Date          |
|-----------|--------------|---------------|
| 1,591,444 | Stein        | July 6, 1926  |
| 1,644,951 | Rodhe        | Oct. 11, 1927 |
| 1,707,624 | Brown        | Apr. 2, 1929  |
| 1,829,649 | Harrison     | Oct. 27, 1931 |
| 1,918,702 | Hebler et al.| July 18, 1933 |
| 1,931,223 | Harrison     | Oct. 17, 1933 |
| 2,127,845 | Ryder        | Aug. 23, 1938 |
| 2,241,555 | Krogh et al. | May 13, 1941  |
| 2,349,860 | Hainer       | May 30, 1944  |

OTHER REFERENCES

Bureau of Standards Publication: "Thermal Conductivity Method for Analysis of Gases." Paper number 249, January 7, 1924.

Bureau of Standards Publication: "An Improved Apparatus and Method for the Analysis of Gas Mixtures by Combustion and Absorption." Paper No. 266, January 1931.